United States Patent
Brooks

(10) Patent No.: US 9,007,232 B2
(45) Date of Patent: Apr. 14, 2015

(54) MUD PULSE TELEMETRY NOISE REDUCTION METHOD

(75) Inventor: Andrew G. Brooks, Tomball, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 230 days.

(21) Appl. No.: 13/819,165

(22) PCT Filed: Aug. 26, 2011

(86) PCT No.: PCT/US2011/049276
§ 371 (c)(1),
(2), (4) Date: Feb. 26, 2013

(87) PCT Pub. No.: WO2012/027633
PCT Pub. Date: Mar. 1, 2012

(65) Prior Publication Data
US 2013/0154845 A1    Jun. 20, 2013

Related U.S. Application Data

(60) Provisional application No. 61/377,187, filed on Aug. 26, 2010.

(51) Int. Cl.
*H04B 13/02* (2006.01)
*G01V 3/18* (2006.01)
*E21B 47/18* (2012.01)
*G01V 11/00* (2006.01)

(52) U.S. Cl.
CPC . *G01V 3/18* (2013.01); *E21B 47/18* (2013.01); *G01V 11/002* (2013.01)

(58) Field of Classification Search
CPC .................................................. G01V 11/002
USPC ...................................................... 340/854.3
See application file for complete search history.

(56) References Cited

U.S. PATENT DOCUMENTS

| | | | | |
|---|---|---|---|---|
| 4,642,800 | A * | 2/1987 | Umeda | 367/85 |
| 5,969,638 | A * | 10/1999 | Chin | 340/855.3 |
| 6,421,298 | B1 * | 7/2002 | Beattie et al. | 367/83 |
| 7,489,591 | B2 * | 2/2009 | Mumby | 367/83 |
| 7,609,169 | B2 * | 10/2009 | Aiello | 340/854.3 |
| 8,009,511 | B2 * | 8/2011 | Hentati | 367/81 |
| 8,811,118 | B2 * | 8/2014 | Reckmann | 367/81 |
| 2008/0002524 | A1 * | 1/2008 | Wassermann et al. | 367/83 |
| 2012/0039151 | A1 * | 2/2012 | Farley et al. | 367/83 |

OTHER PUBLICATIONS

International Search Report for PCT Application Serial No. PCT/US2011/049276 dated Apr. 9, 2012.

* cited by examiner

*Primary Examiner* — Hai Phan
*Assistant Examiner* — Zhen Y Wu
(74) *Attorney, Agent, or Firm* — Kimberly Ballew

(57) ABSTRACT

A method for reducing noise in downhole fluid communications includes processing first and second received signals in combination with a strobe signal from an active pump to obtain pump signatures at first and second spaced measurement locations. The pump signatures are used to compute a transfer function of the fluid channel between the two measurement locations. The transfer function may then be used to estimate the telemetry signal traveling in the uphole direction.

19 Claims, 3 Drawing Sheets

MUD PULSE TELEMETRY NOISE REDUCTION METHOD

RELATED APPLICATIONS

This application claims the benefit of: U.S. Provisional Application Ser. No. 61/377,187 filed Aug. 26, 2010 and entitled Method for Noise Reduction in Mud Pulse Telemetry.

FIELD OF THE INVENTION

The present invention relates generally to downhole communication methods in subterranean drilling operations. In particular, the invention relates to a method for reducing noise and thereby increasing the signal to noise ratio in mud pulse telemetry communications.

BACKGROUND OF THE INVENTION

Typical petroleum drilling operations employ a number of techniques to gather information about the borehole and the formation through which it is drilled. Such techniques are commonly referred to in the art as measurement while drilling (MWD) and logging while drilling (LWD). As used in the art, there is not always a clear distinction between the terms LWD and MWD. Generally speaking MWD typically refers to measurements taken for the purpose of drilling the well (e.g., navigation) and often includes information about the size, shape, and direction of the borehole. LWD typically refers to measurement taken for the purpose of analysis of the formation and surrounding borehole conditions and often includes various formation properties, such as acoustic velocity, density, and resistivity. It will be understood that the present invention is relevant to both MWD and LWD operations. As such they will be referred to commonly herein as "MWD/LWD."

Transmission of data from a downhole tool to the surface is a difficulty common to MWD/LWD operations. Mud pulse telemetry is one technique that is commonly utilized for such data transmissions. During a typical drilling operation, drilling fluid (commonly referred to as "mud" in the art) is pumped downward through the drill pipe, MWD/LWD tools, and the bottom hole assembly (BHA) where it emerges at or near the drill bit at the bottom of the borehole. The mud serves several purposes, including cooling and lubricating the drill bit, clearing cuttings away from the drill bit and transporting them to the surface, and stabilizing and sealing the formation (s) through which the borehole traverses. In a typical mud pulse telemetry operation, a transmission device, such as an electromechanical pulser or a mud siren located near the drill bit generates a series of pressure pulses (in which the data is encoded) that is transmitted through the mud column to the surface. At the surface, one or more transducers convert the pressure pulses to electrical signals, which are then transmitted to a signal processor. The signal processor then decodes the signals to provide the transmitted data to the drilling operator.

One significant difficulty with decoding a mud pulse signal is the poor signal to noise ratio that results from both low signal amplitude and high noise content. Due in part to the poor signal to noise ratio, data transmission rates are slow (e.g., on the order of about 1 to 10 bits per second). Increasing the transmission rate tends to decrease the signal to noise ratio due to decreased signal amplitude. The low signal to noise ratio also tends to increase the frequency of transmission errors which can erode the reliability of the communication channel and disrupt the synchronization between the downhole encoder and the surface decoder.

The amplitude of a transmitted pressure pulse tends to attenuate as it travels up the drill pipe. Such attenuation typically depends on many factors including the depth of the borehole, the type of drilling mud, the number of joints in the drill string, the inner diameter of the drill string, and the frequency of the signal. Moreover, there are a number of potential sources of noise generated during drilling operations including turning of the drill bit and/or drill pipe in the borehole, sliding and/or impact of the drill pipe against the borehole wall, and the mud pump that is used to pump the mud downhole. Mud pump noise tends to be particularly troublesome since the detectors are located at the surface close to the pumps and since the pump noise is typically strong in the frequency range commonly used for data telemetry (e.g., between 1 and 20 Hz).

Distortion of the signal may also be introduced by reflections from the ends of the mud channel, from tool joints or other diameter changes in the drill string, and from dispersion or filtering of certain frequencies within the mud channel. A strong reflection is often observed at the detectors from the uphole end of the mud channel (e.g., from the mud pumps and the pulsation dampeners).

Given the difficulty inherent in mud pulse telemetry operations, there have been numerous efforts to improve the communication channel. For example, Umeda (U.S. Pat. No. 4,642,800) discloses a method in which the measured signals are averaged to produce an average signature signal. The average signature signal may then be subtracted from a current signal so as to remove the noise component and produce a residual signal which contains the data component. One byproduct of this technique is that the pump signature may be estimated.

Various attempts have also been made to remove reflections from the measured signal via the use of first and second spaced transducers. In these attempts, the signal measured at one receiver is generally delayed by the approximate time it takes the pressure wave to travel between the transducers and then subtracted from the signal measured at the other transducer. Such methods have been disclosed by Garcia (U.S. Pat. No. 3,742,443); Rodney (U.S. Pat. No. 4,590,593); and Scherbatskoy (U.S. Pat. No. 4,692,911). Difficulties associated with the removal of reflections include a precise determination of the appropriate time delay, attenuation and/or distortion of the signal between the two transducer locations, and deconvolution of the resulting difference signal to recover the original signal.

Attempts to solve these problems have generally used the received signals to determine a transfer function of the communication channel between the two transducers. Chin (U.S. Pat. No. 5,969,638); Abdallah (U.S. Pat. No. 6,308,562); Fincher (U.S. Pat. No. 7,313,052); Reckmann (U.S. Pat. No. 7,423,550); and Wasserman (U.S. Patent Publications 2008/0002524 and 2009/0016160) disclose such methods. While these approaches enable a transfer function to be estimated they are not without certain drawbacks. For example, a transfer function computed using received signals can be unreliable (and inaccurate) since the received signals include components traveling in both the uphole and downhole directions (e.g., the telemetry signal travels in the uphole direction, while pump noise travels in the downhole direction). An unreliable transfer function results in a misrepresentation of the signal attenuation and/or distortion and therefore can in turn result in telemetry errors.

Therefore, there exists a need for an improved method for reducing noise and other unwanted signals in mud pulse telemetry operations.

SUMMARY OF THE INVENTION

The present invention addresses the need for an improved method for communicating signals through a fluid column in a borehole, and in particular for reducing noise in such communications. Aspects of the invention include a method for reducing noise in downhole fluid communications. In one exemplary embodiment the invention determines periodic variations in fluid pressure and/or fluid flow rate which are synchronized with mud pump rotation. Such synchronization enables the determination of pump signatures (pump noise) at first and second spaced measurement locations (e.g., pressure transducers). The pump signatures are used to compute a transfer function of the fluid channel between the two measurement locations. The transfer function and measurements of pressure and/or flow at the two locations may then be used to estimate the telemetry signal traveling in the uphole direction.

Exemplary embodiments of the present invention may advantageously provide several technical advantages. For example, the present invention advantageously makes use of the pump signatures (the pump noise signal) to compute the transfer function. The resultant transfer function tends to have improved accuracy and precision (due in part to the fact that the pump signatures are typically high amplitude and substantially unidirectional—travelling in the downhole direction). This in turn enables the telemetry signal to be determined with improved accuracy thereby improving the reliability of downhole communications methods. The method tends to be particularly well suited for removing mud pump noise, reflected mud pump noise, and reflected telemetry signals from the received signals.

In one aspect the present invention includes a method for communicating a signal through a fluid in a borehole between a first downhole location and a second uphole location. The method includes receiving signals in the fluid at at least first and second spaced uphole positions, the received signals including at least a telemetry signal, a reflected telemetry signal, and a pump noise signal. A strobe signal from an active pump is also received, the pump being in fluid communication with the first and second positions. A processor processes the received signals and the strobe signal to obtain pump signatures and clean signals at each of the first and second positions. The pump signatures include the pump noise signal and the clean signals include the telemetry signal and the reflected telemetry signal. The processor then computes a transfer function between the first and second positions from the obtained pump signatures and removes the reflected telemetry signal from at least one of the clean signals via processing the transfer function and the clean signals so as to obtain the telemetry signal.

The foregoing has outlined rather broadly the features of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other methods, structures, and encoding schemes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
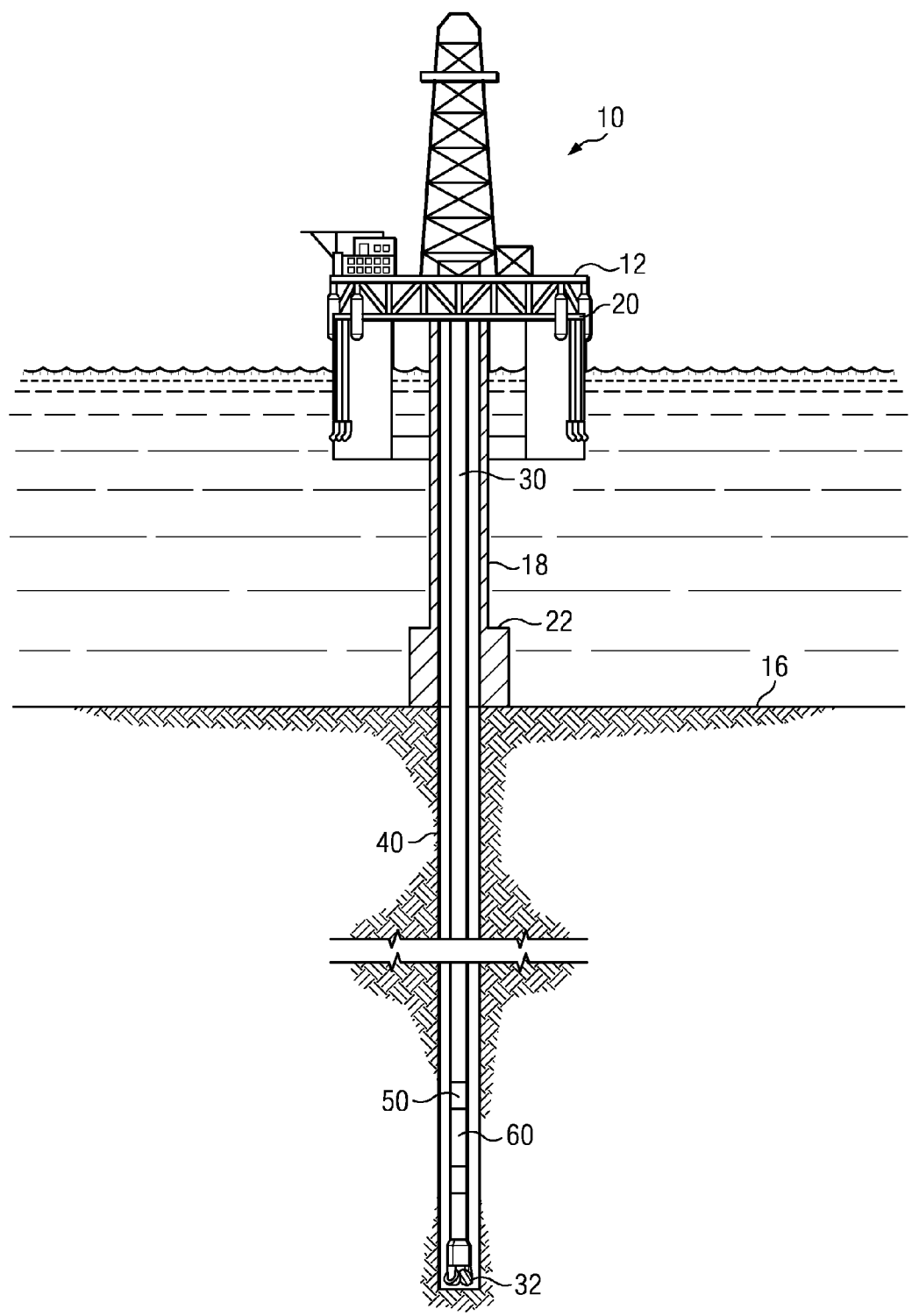
FIG. 1 depicts a conventional drilling rig on which exemplary embodiments of the present invention may be utilized.

Referring now to FIGS. 1 through 4, exemplary embodiments of the present invention are depicted. With respect to FIGS. 1 through 4, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 4 may be described herein with respect to that reference numeral shown on other views.

FIG. 1 depicts an exemplary offshore drilling assembly, generally denoted 10, suitable for employing exemplary method embodiments in accordance with the present invention. In FIG. 1 a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes drill bit 32, a transmission device 50 (e.g., a conventional electromechanical pulser or a mud siren), and at least one MWD/LWD tool 60. Drill string 30 may optionally further include substantially any number of other tools including, for example, other MWD/LWD tools, stabilizers, a rotary steerable tool, and a downhole drilling motor.

It will be understood by those of ordinary skill in the art that the deployment illustrated on FIG. 1 is merely exemplary. It will be further understood that exemplary embodiments in accordance with the present invention are not limited to use with a semisubmersible platform 12 as illustrated on FIG. 1. The invention is equally well suited for use with any kind of subterranean drilling operation, either offshore or onshore.

Figure 2:
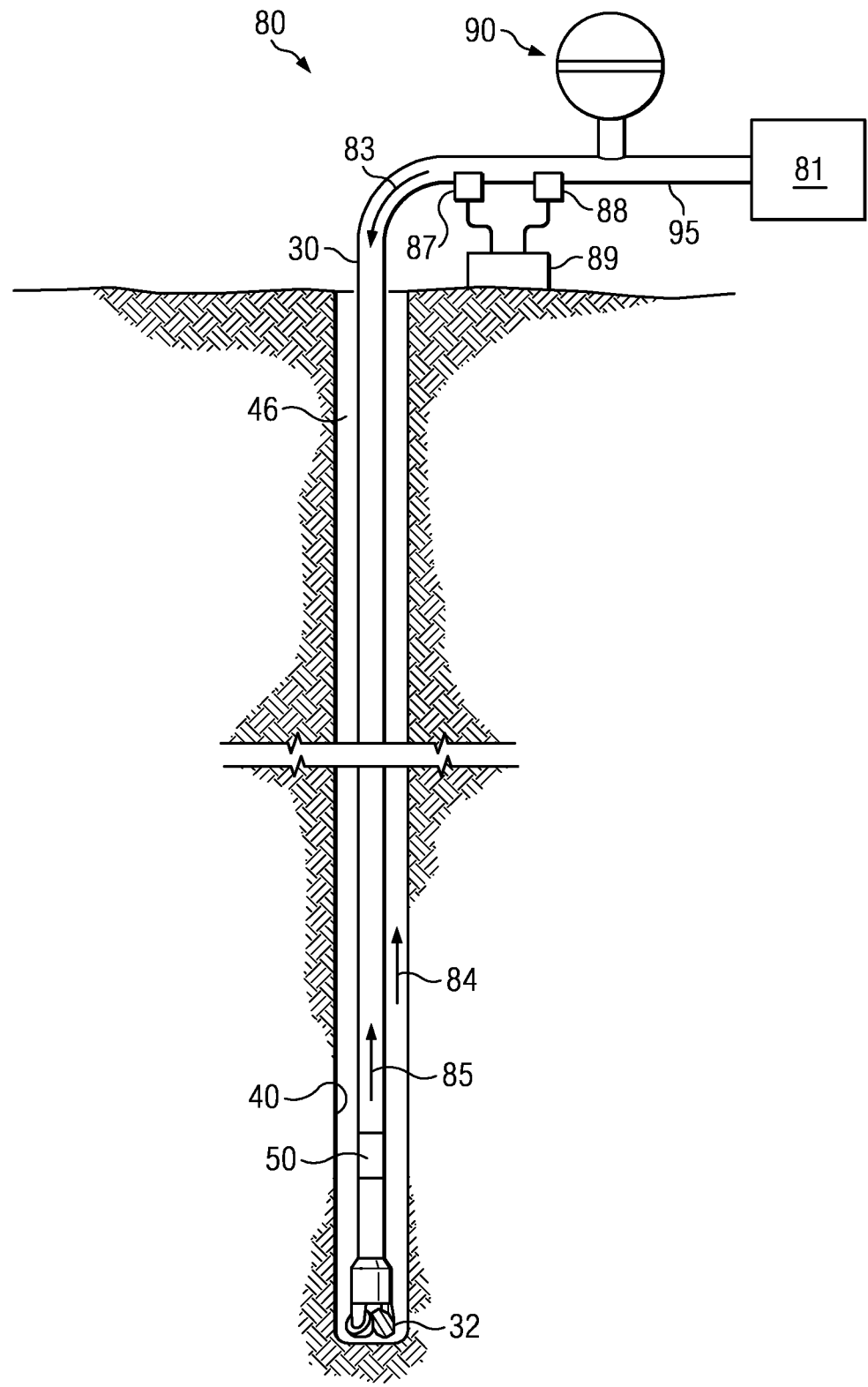
FIG. 2 depicts a conventional mud flow arrangement in which exemplary embodiments of the present invention may be utilized.

Referring now to FIG. 2, an exemplary prior art mud pulse telemetry apparatus 80 is illustrated. A mud pump 81 generates a downward traveling mud flow 83 into a standpipe 95 and down through drill string 30. Rotation of the drill string (and/or drill bit 32) creates borehole 40 in the earth (or in sea floor 16 as shown on FIG. 1). The mud flow 83 emerges at or near the drill bit 32 and creates an upward traveling mud flow 84 through annulus 46 (the space between the drill string 30 and the borehole wall). Conventional rigs commonly further include a pulsation dampener 90 (also referred to in the art as a desurger) that evens out the flow 83 in the standpipe 95 and drill string 30. The pulsation dampener 90 essentially acts like an accumulator to smooth outlet pressure generated by the mud pump 81.

MWD/LWD data is encoded downhole (e.g., via a conventional downhole controller). A transmission device 50, such as a conventional electromechanical mud pulser or a mud siren, produces an acoustic pressure wave 85 (e.g., including a plurality of pressure pulses encoding the data). This pressure wave 85 travels towards the surface at approximately the speed of sound (typically in the range of about 2000 to 4500 feet per second) through the downward traveling mud 83. It will be appreciated that the signal may also be transmitted through and received from the upward traveling mud flow 84 in the annulus 46. It will also be appreciated that the invention is not limited to any particular pressure wave or pressure pulse configuration. Substantially any suitable encoding schemes may be utilized.

The transmitted pressure wave 85 may be received (detected) at first and second sensors (e.g., transducers) 87 and 88 and decoded and analyzed in accordance with the present invention via controller 89 (for example a conventional data acquisition computer or DSP board). It will be understood that substantially any suitable controller 89 configuration may be utilized. Implicit in the control and processing of the received signals described herein is the use of a computer program (software or firmware) executed on a suitable computer platform (hardware) including, for example, a microprocessor and machine readable electronic memory. The invention is explicitly not limited to any particular controller configuration. Substantially any suitable multiple transducer arrangement may also be utilized. Multiple transducer arrangements are known in the art, for example, as disclosed in U.S. Pat. No. 6,421,298 to Beattie et al. Arrangements including three or more transducers may also be utilized.

Figure 3:
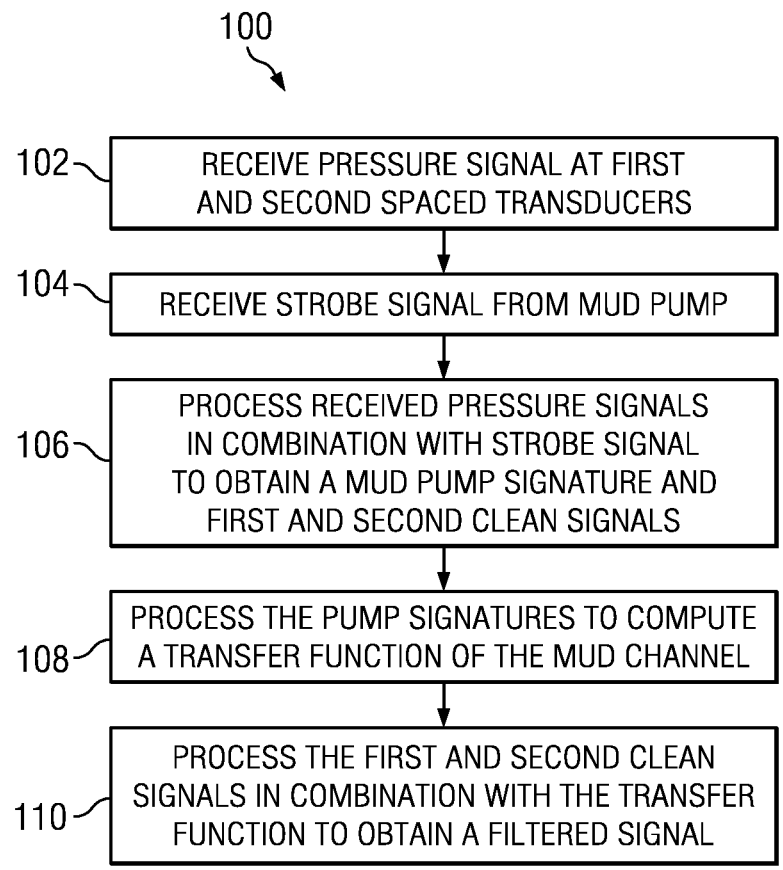
FIG. 3 depicts a flowchart of one exemplary method embodiment in accordance with the present invention.

FIG. 3 depicts a flowchart of one exemplary method embodiment 100 in accordance with the present invention. A pressure signal is received at first and second spaced transducers at 102 (e.g., at transducers 87 and 88 as depicted on FIG. 2). A strobe signal is received from an active mud pump at 104 and processed in combination with the received pressure signals at 106 to obtain first and second pump signatures (corresponding to the first and second transducers) and first and second clean signals (signals from which the pump signatures are removed). The pump signatures are then used to compute a transfer function of the mud channel between the transducers at 108. The first and second clean signals may then be processed in combination with the transfer function at 110 to obtain a filtered signal (which is intended to be very close to the telemetry signal).

As described above, the received pressure signals typically include a series of pressure pulses generated downhole and moving in the uphole direction through the column of drilling fluid (the telemetry signal). The pressure signal typically further includes a noise portion, particularly a pump noise portion generated uphole and moving in the downhole direction through the column of drilling fluid. The pressure signal typically further includes various reflections, for example reflected pump noise moving in the uphole direction and reflected signal pulses moving in the downhole direction. The received pressure signal is generally digitized and stored in a digital controller 89 for subsequent processing.

The exemplary method embodiment depicted on FIG. 3 constructs and maintains an estimate of the noise signature for each active mud pump (it will be understood that many drilling operations simultaneously utilize multiple mud pumps). The noise signature is commonly considered to be the periodic signal introduced by the movement of the mud pump pistons and valves. It may therefore be expressed as a mapping of the pressure variation to the crank position. A crank position sensor enables the appropriate portion of the noise signature to be identified and subtracted from the pressure signal. Crank position signals are referred to herein as "strobes". A strobe signal may be received from each of the mud pumps at 104. The strobe signal may include as few as one strobe per revolution of the pump crank (e.g., as in the case of a proximity switch at the end of a piston stroke) or up to 100 or more strobes per revolution (e.g., as in the case of a bull gear having a tooth sensor). When a bull gear sensor is used, the sample rate of the received signals at 102 must be sufficiently high so as to allow several samples per strobe. Therefore, a bull gear having 100 teeth rotating at 120 strokes per minute generates 200 strobes per second and requires a minimum sample rate on the order of 1000 samples per second (i.e., a sampling rate of one sample per millisecond).

At 106 the pressure signals received at 102 and the strobes received at 104 are processed in combination (e.g., synchronized via a stacking filter) to obtain a pump signature for each active mud pump and first and second residual (clean) signals corresponding to the first and second sensors. The received signals may be processed, for example, via a subtraction filter in which a pump signature for each active pump is removed from the received signal. The resultant residual signal may be thought of as being a clean signal in the sense that direct pump noise has been removed.

Figure 4:
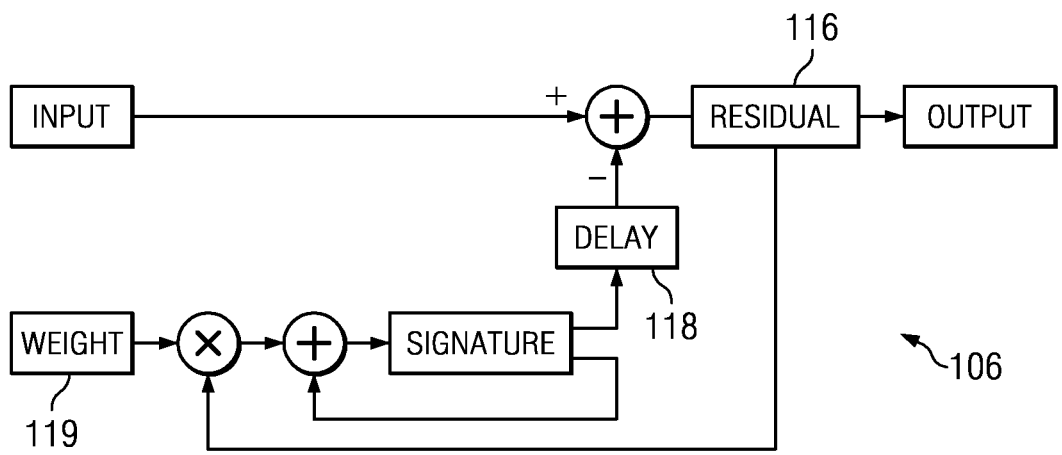
FIG. 4 depicts a block diagram of one exemplary pump subtraction filter for a system including a single active mud pump.

FIG. 4 depicts a block diagram of one exemplary pump subtraction filter for a system including a single active mud pump. The output obtained from the pump subtraction filter is the residual shown at 116. A portion of the residual is divided equally among each of the active pumps (in embodiments in which multiple active pumps are utilized) and added to the appropriate pump signature. Use of a portion of the residual enables the system to track any changes in pump signature, for example, due to a change in pump speed or pump integrity. The delay operation 118 represents the mapping of a signature that has already been estimated onto the corresponding current portion of the crank circle. Since the pump speed may have changed since the signature was updated it may be necessary to resample the signature interval at this time.

The use of multiple pumps generally introduces complications that are not readily apparent in FIG. 4. For example, the residual is preferably not output or updated until each of the signatures from each of the respective active pumps has been subtracted. Moreover, the system also generally needs a means to determine which pumps are active and to determine what fraction (or weight 119) of the residual should be added into each signature. As is known to those of ordinary skill in the art, pumps may be routinely taken on and offline during a drilling operation (and therefore during operation of the telemetry operation). In one exemplary embodiment of the invention, the status of a pump may be determined according to whether or not the time between consecutive strobes has exceeded a predetermined time limit. An inactive pump may also be re-activated as soon as a strobe is received from the pump.

While not depicted on FIG. 4, one exemplary embodiment of the pump subtraction filter includes first and second processing loops. The first processing loop may be executed whenever a strobe is received for any of the active pumps. At this time a signature interval may be defined for that particular pump. The corresponding interval may be identified in the stored signature, resampled if necessary, and subtracted from the current interval in a data buffer (or data block).

The second processing loop, which updates the signature block, may be entered when each of the active pump signatures has been subtracted from the received signal. In one exemplary embodiment of the invention the residual signal is multiplied by a weighting scalar 119 and added to the stored signature. It is generally desirable to use a small weighting scalar in order to promote stability and to minimize echoes, however, the weighting scalar must be large enough so as to promote the recognition of a changing pump status (e.g., pump startup/shutdown or a change in pump signature such as might be caused by a sticking or leaking valve or a faulty crank or gear sensor). In one exemplary embodiment of the invention the weighting scalar is set to unity (the full residual is used) for the first pump cycle after pump activation and is then reduced by some predetermined value on each cycle until it reaches a preset fraction (e.g., approximately one percent of the residual value). Adaptive weighting schemes may also be utilized.

The signature updating may also include steps to remove trends and DC offsets from the signature. Trend removal may be accomplished, for example by determining the mismatch between the last point in the signature update cycle and the last point in the previous cycle, distributing the mismatch evenly along the length of the signature cycle, and subtracting it to remove any slope. Similarly, the update signature may be reset so that its average (mean) is equal to zero, thereby ensuring that all DC components remain in the output.

As described above, the pump subtraction filter (which also may be described as a stacking filter or an averaging filter) outputs an estimated pump signature at each transducer for each active pump. A transfer function may then be determined at 108 using the pump signature from any of the active pumps, however, it is generally advantageous to use the pump signature having the greatest amplitude so as to maximize the accuracy and precision of the transfer function. Use of the pump signature to compute the transfer function is advantageous for several reasons. First, the transducers are generally located in close proximity to the pump(s) which results in a high amplitude pump noise. Second, the pump noise is substantially unidirectional (traveling in the downhole direction). These and other factors enable the transfer function to be computed with improved accuracy and precision as compared to the prior art.

The transfer function H between the first and second transducer locations may be computed, for example, as follows:

$$H = \frac{DFT(\text{pump2})}{DFT(\text{pump1})} \qquad \text{Equation 1}$$

where pump1 represents the periodic pump signature at the upstream transducer (the transducer closest to the pump), pump2 represents the periodic pump signature at the downstream transducer (the transducer furthest from the pump), and DFT is the discrete Fourier transform operation.

After the transfer function has been computed at 108, the first and second clean signals obtained at 106 and the transfer function are processed at 110 to obtained a directionally filtered signal (which is preferably very close to the telemetry signal). As is known to those of ordinary skill in the art (and as described above), the pressure signals measured at 102 include both uphole and downhole traveling components. In general, the downhole traveling pump noise and the uphole traveling pump reflections are removed at 106 via the pump stacking filter. It is generally desirable to further remove the downhole traveling reflected pressure signals (the reflected telemetry signal) and to compensate for any attenuation and/or distortion between the transducers. The reflected telemetry signals may be removed via removing the remaining downhole traveling components, for example, as follows:

The clean signals computed for the upstream and downstream transducers $T_1$ and $T_2$ may be expressed mathematically in the frequency domain, for example, as follows:

$$DTFT(T_1) = DTFT(N) + H \cdot DTFT(S) \qquad \text{Equation 2}$$

$$DTFT(T_2) = DTFT(S) + H \cdot DTFT(N) \qquad \text{Equation 3}$$

where S represents the uphole traveling component (the telemetry signal), N represents the downhole traveling component (the reflected telemetry signal, i.e., the noise), H represents the transfer function (e.g., as computed using Equation 1), and DTFT represents the discrete time Fourier transform operation.

The unwanted downhole traveling component N may be removed, for example, by the following mathematical operation:

$$DTFT(T_2) - H \cdot DTFT(T_1) = DTFT(S) - H \cdot H \cdot DTFT(S) \qquad \text{Equation 4}$$

The discrete time Fourier transform of the desired telemetry signal DTFT(S) may be obtained by dividing both sides of Equation 4 by the transfer function operator (1−H·H) as given in Equation 5.

$$DTFT(S) = \frac{DTFT(T_2) - H \cdot DTFT(T_1)}{1 - H \cdot H} \qquad \text{Equation 5}$$

While Equations 2-5 are in the frequency domain, it will be understood that the reflected telemetry signal may also be removed in the time domain. In the time domain, variations in pump speed cause corresponding variations in the length of the transfer function. While the invention is not limited in these regards, it is generally advantageous to utilize time domain filters as it tends to be less complex to deal with a time domain filter having a varying length (if the data are sampled at a constant rate) than a Fourier transform whose length is changing.

The time domain equivalent to Equation 5 may be expressed mathematically, for example, as follows:

$$S = T_2 * F_1 - T_1 * F_2 \qquad \text{Equation 6}$$

where S represents the telemetry signal, $T_1$ and $T_2$ represent the clean signals computed at the upstream and downstream transducers, and * represents the convolution operator. $F_1$ and $F_2$ are related to the transfer function H as follows:

$$F_1 = IDFT\left(\frac{1}{1 - H \cdot H}\right) \qquad \text{Equation 7}$$

$$F_2 = IDFT\left(\frac{H}{1 - H \cdot H}\right) \qquad \text{Equation 8}$$

where IDFT represents the inverse discrete Fourier transform. In practice it is generally desirable to set the first elements of the transforms 1/(1−H·H) and H/(1−H·H) to zero before forming the IDFT so as to eliminate the DC offset.

Step 110 of FIG. 3 may be also be represented as follows in the time domain in a simplified embodiment in which the two transducer locations are assumed to be separated by a time delay without signal distortion (i.e., having a transfer function equal to unity). In such a simplified embodiment, the received signals at the two transducers $T_1(t)$ and $T_2(t)$ may be represented mathematically in the time domain, for example, as follows:

$$T_1(t)=N(t)+S(t-dt) \quad \text{Equation 9}$$

$$T_2(t)=S(t)+N(t-dt) \quad \text{Equation 10}$$

where S(t) represents the uphole traveling time domain signal (the telemetry signal), N(t) represents the downhole traveling reflected signal and dt represents the time delay (the time necessary for the waves to propagate from one transducer location to the other). The downhole traveling component N may be removed by the following operation (which is analogous to Equation 4):

$$T_2(t)-T_1(t-dt)=S(t)-S(t-2dt) \quad \text{Equation 11}$$

While the downhole traveling component has been removed in Equation 11 the result is not equal to the original telemetry signal S(t), but rather to the telemetry signal S(t) with an echo S(t−2dt). An additional step may therefore be utilized to deconvolve the output and recover the original telemetry signal. For example, the output of Equation 11 may be deconvolved via the use of an IIR filter of the form S(t) =Sc(t)+S(t−2dt), where Sc(t) represents the convolved signal. In this case, the time delay may be determined, for example, by locating a peak in the cross-correlation between pump signatures computed at the two locations.

It will be understood that the telemetry signal (once received) may be decoded using substantially any known schemes. Suitable schemes include, but are not limited to, pulse position coding (e.g., combinatorial coding), amplitude shift keying (ASK), frequency shift keying (FSK), phase shift keying (PSK), and combinations thereof While the invention has been described above with respect to received pressure pulses and the use of corresponding pressure transducers, it will be understood that the invention is not limited in this regard. The received signals may alternatively include fluid flow rate signals.

Although the present invention and its advantages have been described in detail, it should be understood that various changes, substitutions and alternations can be made herein without departing from the spirit and scope of the invention as defined by the appended claims.

I claim:

1. A method for communicating a signal through a fluid in a borehole between a first downhole location and a second uphole location, the method comprising:
   (a) receiving signals in the fluid at at least first and second spaced uphole positions, the received signals including at least a telemetry signal, a reflected telemetry signal, and a pump noise signal;
   (b) receiving a strobe signal from an active pump, the pump being in fluid communication with the first and second positions;
   (c) causing a processor to process the signals received in (a) and the strobe signal received in (b) to obtain pump signatures and clean signals at each of the first and second positions, the pump signatures including the pump noise signal and the clean signals including the telemetry signal and the reflected telemetry signal;
   (d) causing the processor to compute a transfer function between the first and second positions from the pump signatures obtained in (c); and
   (e) causing the processor to remove the reflected telemetry signal from at least one of the clean signals via processing the transfer function computed in (d) and the clean signals obtained in (c) so as to obtain the telemetry signal.

2. The method of claim 1, further comprising:
   (f) causing the processor to decode the telemetry signal.

3. The method of claim 2, wherein said decoding in (f) utilizes at least one of pulse position coding, amplitude shift keying (ASK), frequency shift keying (FSK), and phase shift keying (PSK).

4. The method of claim 1, wherein the signals received in (a) comprise fluid pressure signals.

5. The method of claim 1, wherein a plurality of strobe signals are received in (b) from a corresponding plurality of active pumps.

6. The method of claim 1, wherein said processing in (c) comprises a stacking algorithm.

7. The method of claim 1, wherein the transfer function is computed in (d) according to the following mathematical equation:

$$H = \frac{DFT(\text{pump2})}{DFT(\text{pump1})}$$

wherein H represents the transfer function, pump1 and pump2 represent the pump signatures obtained in (c) at the first and second positions, and DFT is the discrete Fourier transform operation.

8. The method of claim 1, wherein the telemetry signal is obtained in (e) in the frequency domain according to the following mathematical equation:

$$DTFT(S) = \frac{DTFT(T_2) - H \cdot DTFT(T_1)}{1 - H \cdot H}$$

wherein S represents the telemetry signal, $T_1$ and $T_2$ represent the clean signals obtained in (c), H represents the transfer function computed in (d), and DTFT represents the discrete time Fourier transform operation.

9. The method of claim 1, wherein the telemetry signal is obtained in (e) in the time domain according to the following mathematical equation:

$$S=T_2 * F_1 - T_1 * F_2$$

wherein S represents the telemetry signal, $T_1$ and $T_2$ represent the clean signals obtained in (c), * represents the convolution operator, and $F_1$ and $F_2$ are related to the transfer function H as follows:

$$F_1 = IDFT\left(\frac{1}{1 - H \cdot H}\right);$$

$$F_2 = IDFT\left(\frac{H}{1 - H \cdot H}\right);$$

wherein IDFT represents the inverse discrete Fourier transform operation.

10. A system for communicating a signal through a fluid in a borehole between a first downhole location and a second uphole location, the system comprising:
   a transmission device deployed at the downhole location;
   first and second sensors deployed at first and second spaced apart positions at the uphole location; and
   a controller configured to: (i) receiving signals from the first and second sensors, the received signals including at least a telemetry signal, a reflected telemetry signal, and a pump noise signal; (ii) receive a strobe signal from an active pump, the pump being in fluid communication with the first and second positions; (iii) process the received signals and the strobe signal to obtain pump signatures and clean signals at each of the first and second positions, the pump signatures including the pump noise signal and the clean signals including the telemetry signal and the reflected telemetry signal; (iv) compute a transfer function between the first and second positions from the pump signatures; and (v) remove the reflected telemetry signal from at least one of the clean signals via processing the transfer function and the clean signals so as to obtain the telemetry signal.

11. The method of claim 10, wherein the controller is further configured to (vi) decode the telemetry signal.

12. The method of claim 11, wherein said decoding in (vi) utilizes at least one of pulse position coding, amplitude shift keying (ASK), frequency shift keying (FSK), and phase shift keying (PSK).

13. The method of claim 10, wherein the transmission device comprises an electromechanical pulser and a mud siren.

14. The method of claim 10, wherein the first and second sensors comprise first and second transducers.

15. The method of claim 10, wherein the controller is configured to receive a plurality of strobe signals from a corresponding plurality of active pumps.

16. The method of claim 10, wherein the controller is configured to execute a stacking algorithm in (iii).

17. The method of claim 10, wherein the controller is configured to compute the transfer function in (iv) according to the following mathematical equation:

$$H = \frac{DFT(\text{pump2})}{DFT(\text{pump1})}$$

wherein H represents the transfer function, pump1 and pump2 represent the pump signatures obtained in (iii) at the first and second positions, and DFT is the discrete Fourier transform operation.

18. The method of claim 10, wherein the controller is configured to obtain the telemetry signal in the frequency domain in (v) according to the following mathematical equation:

$$DTFT(S) = \frac{DTFT(T_2) - H \cdot DTFT(T_1)}{1 - H \cdot H}$$

wherein S represents the telemetry signal, $T_1$ and $T_2$ represent the clean signals obtained in (iii), H represents the transfer function computed in (iv), and DTFT represents the discrete time Fourier transform operation.

19. The method of claim 10, wherein the controller is configured to obtain the telemetry signal in the time domain in (v) according to the following mathematical equation:

$$S = T_2 * F_1 - T_1 * F_2$$

wherein S represents the telemetry signal, $T_1$ and $T_2$ represent the clean signals obtained in (iii), * represents the convolution operator, and $F_1$ and $F_2$ are related to the transfer function H as follows:

$$F_1 = IDFT\left(\frac{1}{1 - H \cdot H}\right);$$

$$F_2 = IDFT\left(\frac{H}{1 - H \cdot H}\right);$$

wherein IDFT represents the inverse discrete Fourier transform operation.

* * * * *